April 26, 1949.   T. W. MILLNS   2,468,506
SCREW AND NUT MECHANISM
Filed March 12, 1947   2 Sheets-Sheet 1

Inventor
T. W. Millns
By Glascock Downing Seebold
Attys

April 26, 1949. T. W. MILLNS 2,468,506
SCREW AND NUT MECHANISM

Filed March 12, 1947 2 Sheets-Sheet 2

Inventor
T. W. Millns
By Glascock Downing Duffield
Attys

Patented Apr. 26, 1949

2,468,506

UNITED STATES PATENT OFFICE 2,468,506

SCREW AND NUT MECHANISM

Terence William Millns, London, England, assignor to Rotax Limited, London, England Application March 12, 1947, Serial No. 734,147
In Great Britain March 16, 1946

2 Claims. (Cl. 74—459)

This invention has for its object to provide an improved screw and nut mechanism of the kind in which the connection between the nut and screw is effected by a series of balls, and in which the nut is provided with a transfer passage or passages for the balls.

The invention consists in a mechanism of the kind specified comprising the combination of a screw having a helical groove, a helically grooved nut having one or more transfer passages, and an intermediate bush having a helical slot or slots, the bush being provided with tongue pieces situated adjacent to the ends of the said passage or passages and extending into the groove of the screw for guiding the balls into and out of the said passage or passages.

Figure 1:
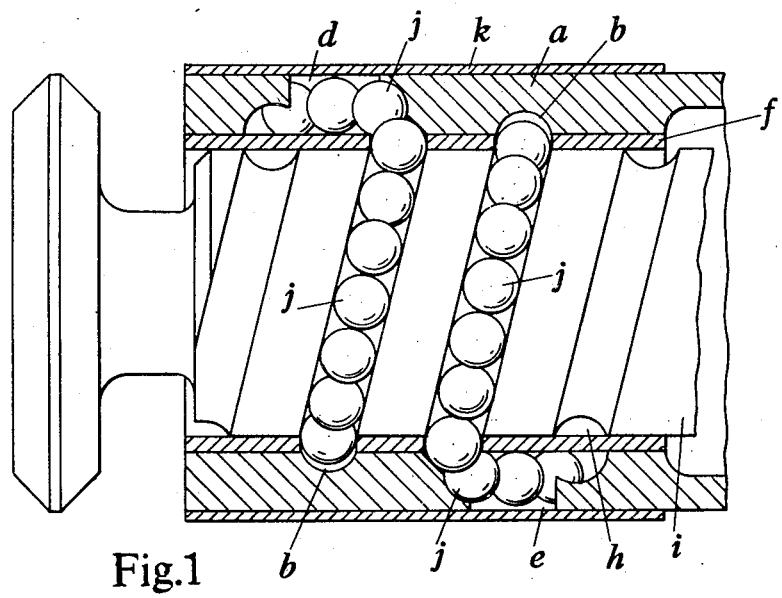
Figure 2:
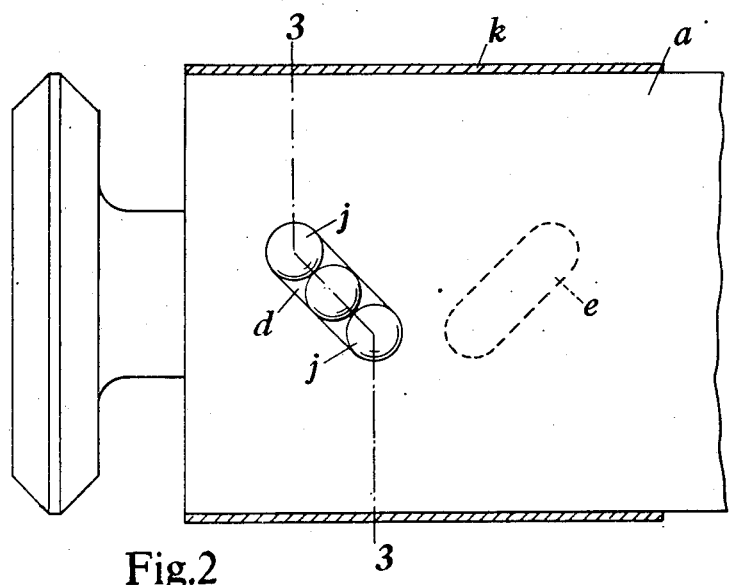
Figure 3:
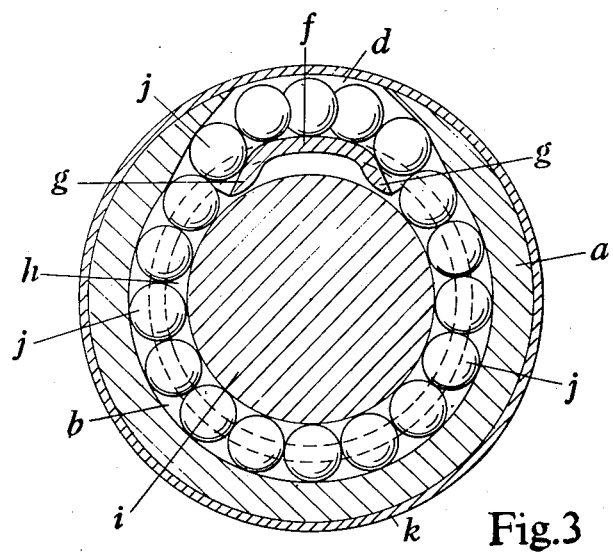

In the accompanying drawings, Figures 1, 2 and 3 are respectively sectional side elevation, plan and cross section of a screw and nut mechanism embodying the invention, Figure 3 being a section on the line 3—3, Figure 2.

Referring to Figures 1–3, the nut $a$ has formed within it a helical groove $b$. Two parts of this groove are interconnected by transfer passages $d$, $e$. Within the nut is inserted a thin bush $f$ which fits the bore of the nut and is secured in any convenient manner. In the bush are formed a pair of helical slots corresponding to parts of the helical groove in the nut. At each end of each of the helical slots in the bush and at positions coinciding with the ends of the transfer passages, is formed a tongue piece $g$ which extends into the adjacent part of the helical groove $h$ in the screw $i$, the tongue pieces being suitably shaped to guide the balls $j$ and enable them to move freely into or out of the transfer passages. In Figure 3 are shown the tongue pieces located at the ends of the transfer passage $d$. Similar tongue pieces are provided on the bush adjacent to the ends of the passage $e$.

The transfer passages in the nut extend (in the example illustrated) to the outside of the nut and are closed at their outer sides by a sleeve $k$ surrounding the nut.

The mechanism shown in the drawings form part of a device ordinarily known as a jack or actuator in which the screw $i$ is slidable relatively to the rotary nut $a$, but the invention is applicable in essentially the same manner to other forms of nut and screw mechanisms of the kind specified.

By this invention I am able to provide in a mechanism of the kind specified a nut of simple construction and also facilitate the required free movements of the balls around their course or courses.

Having thus described my invention what I claim as new and desire to secure by Letters Patent is:

1. In a screw and nut mechanism of the kind in which the connection between the nut and screw is effected by a series of balls, the combination of a screw having a helical groove, a helically grooved nut having a transfer passage, an intermediate bush having a helical slot for receiving the balls, and tongue pieces on the bush situated adjacent to the ends of the said transfer passage and extending into the groove of the screw for guiding the balls into and out of the said passage.

2. In a screw and nut mechanism of the kind in which the connection between the nut and screw is effected by a series of balls, the combination of a screw having a helical groove, a helically grooved nut having a plurality of transfer passages, an intermediate bush secured in the nut and having a plurality of helical slots for receiving the balls, and tongue pieces on the bush situated adjacent to the ends of the said transfer passages and extending into the groove of the screw for guiding the balls into and out of the said passage.

TERENCE WILLIAM MILLNS.

REFERENCES CITED

The following references are of record in the file of this patent:

UNITED STATES PATENTS

| Number | Name | Date |
|--------|------|------|
| 477,642 | Brunthauer | June 28, 1892 |
| 2,166,106 | Gormley | July 18, 1939 |
| 2,227,111 | Sturm | Dec. 31, 1940 |